United States Patent
Goodison et al.

(10) Patent No.: US 7,229,020 B2
(45) Date of Patent: Jun. 12, 2007

(54) CABLING SYSTEM

(75) Inventors: Paul James Goodison, Makati (GB);
Paul Deacon Friday, Makati (GB);
Randall Lumbewe, North Manly (AU)

(73) Assignee: Cormant Technologies, Inc., Metro Manila (PH)

( * ) Notice: Subject to any disclaimer, the term of this patent is extended or adjusted under 35 U.S.C. 154(b) by 198 days.

(21) Appl. No.: 10/669,230

(22) Filed: Sep. 23, 2003

(65) Prior Publication Data
US 2004/0065470 A1    Apr. 8, 2004

(30) Foreign Application Priority Data
Sep. 25, 2002    (GB)    ................................ 0222262.8

(51) Int. Cl.
*G06K 7/10*    (2006.01)
(52) U.S. Cl. .......................... 235/462.01; 235/462.13; 235/462.45; 235/462.46
(58) Field of Classification Search ........... 235/462.13, 235/462.01, 462.45, 462.46
See application file for complete search history.

(56) References Cited

U.S. PATENT DOCUMENTS

| | | | | |
|---|---|---|---|---|
| 5,704,189 A | * | 1/1998 | Collier | ........................ 52/741.1 |
| 6,293,467 B1 | * | 9/2001 | Reddersen et al. | ..... 235/462.15 |
| 2002/0161474 A1 | * | 10/2002 | Dimitri et al. | .............. 700/214 |

OTHER PUBLICATIONS

Hyozu Haruhiko, et al., Patch Panel Connection Detecting System, Japanese Application No. 1993023793, Abstract, Sep. 24, 1993.
Ichimori Yasufumi, Cable Identifying Device, Japanese Application No. JP9204435, Abstract, Aug. 5, 1997.

* cited by examiner

*Primary Examiner*—Karl D Frech
(74) *Attorney, Agent, or Firm*—Darby & Darby

(57) ABSTRACT

A system for managing a structured cabling system, together with the attached equipment and devices, utilises a handheld scanner to record moves, adds and changes by scanning machine-readable identifiers (such as bar-code labels) attached to structured cabling components, including but not limited to active and passive communications equipment, cross-connects, patch cords, backbone connections and peripheral equipment. The system records or audits crossconnects by scanning the label of each port and cable in a cross-connect and correlating the cable identifiers to infer the connections. Complete end-to-end connections ('channels') can be inferred in the same way, and the system provides a mechanism to filter the display of channels to provide the most relevant details, including display of only frequently changed components, incomplete channels and permanent patches ('patch by exception'). The system can also provide a mechanism to record channel constraints to define which communications protocols ('applications') can run over which categories of cabling ('category'), which combinations of categories are allowed, and what the maximum channel length is for a particular application and category. The system can provide warnings upon connection of components or completion of a channel.

20 Claims, 2 Drawing Sheets

CABLING SYSTEM

FIELD OF THE INVENTION

This invention relates to a cabling system, such as a structured cabling system for use in computer systems, and to methods and procedures for managing cabling systems, active and passive voice an/data networks and the like.

BACKGROUND TO THE INVENTION

Structured cabling systems allow voice and data services to be delivered to users in a manner that is both flexible and reliable. The disadvantage of this flexibility is that changes can be frequent, making it difficult to keep track of connections between communications equipment and peripheral (workstation or other end-user) equipment. Poor record keeping can result in critical data and voice services being accidentally disconnected, wastage of the infrastructure, difficulty in troubleshooting problems and difficulty in planning and executing disaster recovery strategies.

Historically, structured cabling record management has been done using manual record keeping. This is prone to error and is reliant on the discipline of the engineers to record changes in the system after they have been made.

The problem is made worse by the fact that at least two entries are required for every move or change to be made, where records have to be updated for both the workstation side and the communications equipment side. In the case of links involving backbone connections, up to four entries may have to be cross-referenced in order to determine which workstation is connected to which communications equipment.

The complexity of referencing manual records, coupled with their inherent lack of portability makes manual systems unsuitable for troubleshooting and disaster recovery scenarios.

More recently, computer applications have been used to record structured cabling moves, additions and changes. However the majority suffer the problem that they are not portable and still rely on discipline to keep them up to date. Additionally, most systems are not flexible enough to record details of the plethora of network components, backbone cabling, connection options and necessary data on communications equipment that exist in the real world.

Some vendors supply hardware solutions for managing cabling systems. These consist of specialised patch panels and cables which have an extra conductor to detect changes to the cabling. However, these solutions are costly to install or retrofit to existing systems and do not support all components of the infrastructure.

SUMMARY OF THE INVENTION

According to an aspect of the present invention, there is provided a method of managing a cabling system including the steps of providing one or more cables with a machine readable identifier, providing one or more locations with a machine readable location identifier, locating the cable or cables at one or more of said locations, reading by machine said cable identifier or identifiers and said location identifier or identifiers and generating a list of cable locations based on the read identifiers, and storing said list for later retrieval.

Advantageously, the or each cable is provided with a cable identifier at each terminal thereof and the list generated includes data for determining cable connections from the cable identifiers. In a practical embodiment, each cable is provided with the same identifier at each of its terminals, although the system could also provide for different identifiers so as to be able to determine which terminal of a cable has been located.

Preferably, the method includes the step of providing a hand-held device for machine reading the cable and location identifiers. In this embodiment, there is preferably provided a central processor connectable with the hand-held machine for the download of read identifiers, a master list being stored within the central processor. The connection of the hand-held machine to the central processor may be wireless, preferably providing for two-way communication.

In the preferred embodiment, the method includes the step of identifying components from the cable and location identifiers, the list including data relating to the components and thereby of the connections between components. In the case of a computer system, this can provide the central processor with details as to which components are present, such as computers and peripheral devices, and how they are connected to one another.

The method advantageously includes the step of identifying changes that have occurred in the recorded connections within a specified period of time, thereby to be able to determine which changes might have an impact on a service that is experiencing problems.

Advantageously, the method includes the step of integrating data and voice configuration information into a structured cabling and equipment browser to provide a single view of all information related to the structured cabling channel and services provided.

According to another aspect of the present invention, there is provided a cabling management system including a machine readable cable identifier for use with one or more cables, a machine readable location identifier for use at one or more locations, an identifier reading device operable to machine read said cable identifier or identifiers and said location identifier or identifiers and to generate a list of cable locations based on the read identifiers, and machine readable memory means operable to store said list for later retrieval.

Advantageously, a cable identifier is provided at each terminal of a cable and the list generated includes data for determining cable connections from the cable identifiers. In a practical embodiment, each cable is provided with the same identifier at each of its terminals, although the system could also provide for different identifiers so as to be able to determine which terminal of a cable has been located.

Preferably, identifier reading device is a hand-held device. In this embodiment, there is preferably provided a central processor connectable with the hand-held device for the download of read identifiers, a master list being stored within the central processor. The connection of the hand-held device to the central processor may be wireless, preferably providing for two-way communication.

In the preferred embodiment, the central processor is operable to identify components from the cable and location identifiers, the stored list including data relating to the components and thereby of the connections between components. In the case of a computer system, this can provide the central processor with details as to which components are present, such as computers and peripheral devices, and how they are connected to one another.

The central processor is preferably operable to identify changes that have occurred in the recorded connections within a specified period of time, thereby to be able to determine which changes might have an impact on a service that is experiencing problems.

Advantageously, the central processor is operable to integrate data and voice configuration information into a structured cabling and equipment browser to provide a single view of all information related to the structured cabling channel and services provided.

In one embodiment, there is provided a system for managing a structured cabling system including: machine-readable identifiers, such as but not limited to bar-code labels, attached to all structured cabling components, including active and passive communications equipment, cables, cable pathways, cross-connects, patch cords and peripheral equipment; one or more hand-held computers equipped with a machine-readable identifier reader to record moves and changes by scanning port and cable identifiers; provision for storing details of all equipment, its location and type in a relational database on the hand-held scanners and a PC system; provision for synchronising the hand-held databases with a desktop system or server so that changes made on any system are recorded on all systems; and wireless local area network technology to synchronise the hand-held system database with the desktop system or server.

A preferred method for recording or auditing connections in a structured cabling system includes the steps of: labelling both ends of each patch cord with same identifier, the identifiers being unique for all patch cords; labelling each port in the cross connect with a unique identifier; using a hand-held scanner to record sequentially the identifiers of each port and the identifiers of the cable connected to it; inferring which ports are connected together by correlating the identifiers on the cables without the need to trace the physical cables; and utilising a one-click approach to making, breaking and auditing connections optimised for the changing of connections in patch-panels.

A preferred hierarchical method of classifying infrastructure component types includes the steps of: locating generic equipment types at the top of the hierarchy, with increasingly specific components lower in the hierarchy; providing configurable attributes that can be assigned to any level in the hierarchy; and providing for inheritance of attributes from higher to lower levels in the hierarchy.

A preferred method of defining which sub-components may be contained or must be contained in a type of equipment includes the steps of: allowing sub-component types to be defined for an equipment template; providing a series of dialogue boxes ('wizards') triggered on entering the equipment into the system which prompt for numbers and names of sub-components and create the sub-components and any additional sub-sub-components to any depth; and constraint checking when any sub-components are added or deleted.

A preferred method of choosing the level of detail displayed when viewing a structured cabling channel includes the steps of: assigning a detail number to each connection with higher numbers assigned to more frequently changed connections; selecting a detail level when browsing connections; and displaying connections only if the detail level of the connection is greater than or equal to the selected viewing detail level.

A preferred method of troubleshooting problems with data or voice services in a structured cabling system includes the steps of: regularly downloading configuration information of active components, including but not limited to PABX, router and switched hub; identifying changes that have occurred in the configuration within a specified period of time that might have an impact on a service that is experiencing problems; and integrating the data and voice configuration information into a structured cabling and equipment browser to provide a single view of all information related to the structured cabling channel and services provided by that channel.

The preferred embodiments provide for the recording and retrieval of all details pertaining to a structured cabling system and related infrastructure ('the infrastructure'), including backbone and horizontal cabling, cross-connects, fixed cabling, communications equipment, peripheral equipment and other passive and active components ('components'). The invention covers voice, data and other services, both analogue and digital, that make use of structured cabling for transmission.

DESCRIPTION OF THE DRAWINGS

Embodiments of the present invention are described below, by way of example only, with reference to the accompanying drawings, in which.

DESCRIPTION OF THE PREFERRED EMBODIMENTS

Overview

Figure 1:
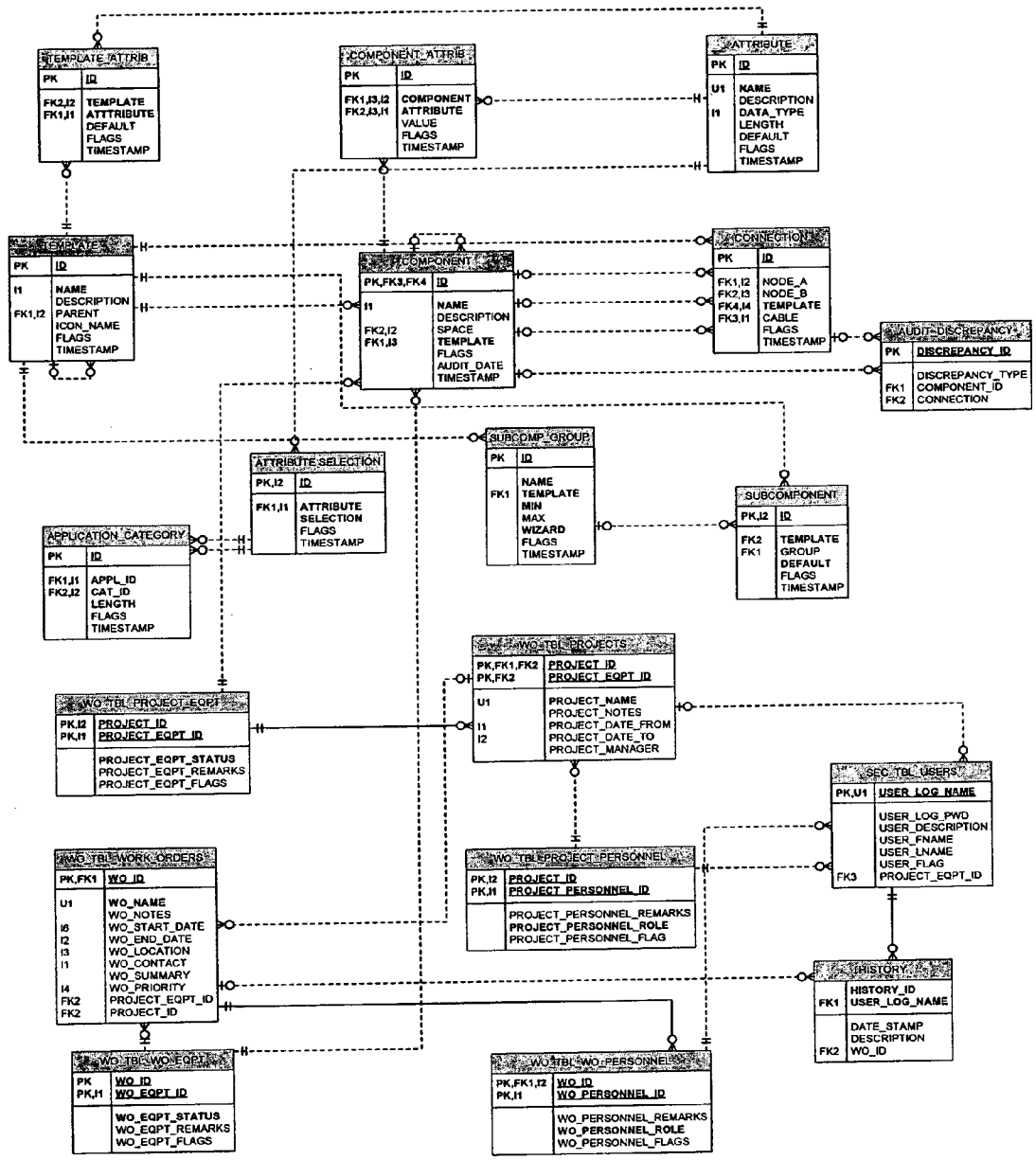
FIG. 1 shows in schematic form the structure of a preferred embodiment of database schema.
Figure 2:
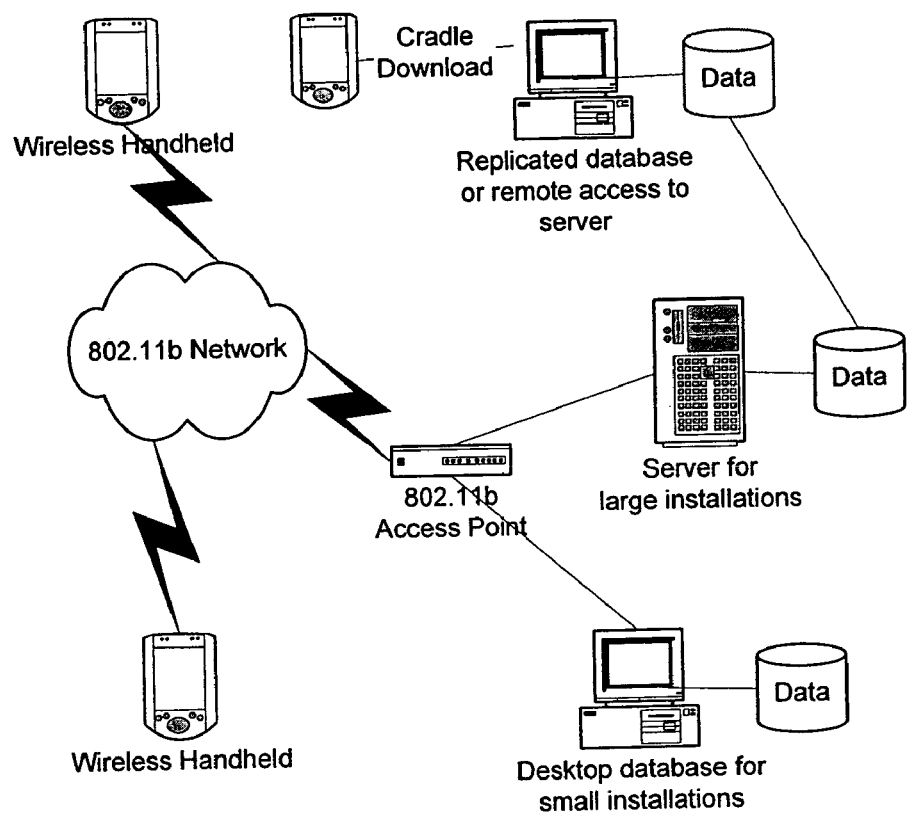
FIG. 2 shows in schematic form the preferred embodiment of cable management system.

The described embodiment provides a structured cable management and work order scheduling system, which allows communications equipment, peripheral equipment and connectivity equipment ('components') as well as connections between these components to be recorded and managed. The system includes tools to record component details, make and break connections and audit components and connections. Additionally, the system includes a work order management component, which allows changes to the components and connections to be scheduled, assigned to engineers, tracked, and related to change requests.

The system runs on a combination of desktop PC and a handheld device, to take advantage of the desktop environment for planning, large-scale data entry, work order management and reporting, and the portability of the handheld for in-field use, primarily for recording the movement of equipment, making and breaking of connections and troubleshooting.

The handheld device includes a machine-readable identifier reader such as a bar-code scanner to allow changes to connections to be recorded quickly and accurately. The majority of the infrastructure, especially frequently changed components such as patch panel ports and cables, are fitted with machine-readable identifiers. Changes to connections then involve scanning the identifiers of the port and/or cable and choosing to connect or disconnect.

The preferred system supports multiple desktop and handheld devices, which can share a common set of data to allow the management of large facilities involving a number of IT management and engineering personnel. Synchronisation between these devices is via a server. Desktop systems use remote database access, and handheld devices synchronise with a handheld database using cradle downloads or a wireless network. The wireless network allows changes to be reflected to all users as soon as they are made, and allows work orders to be dispatched to personnel in the field. The system uses a relational database for storage of equipment, work order and connectivity details, which allows flexibility in reporting configuration and change history.

The desktop and handheld devices provide an explorer-style interface to allow management of equipment and connections. This explorer allows equipment, connections and work orders to be arranged in a hierarchical fashion to make the retrieval of data manageable.

For the assistance of the reader, a definitions section is given at the end of this description, in case the reader is unfamiliar with some of the terms used herein.

Component Templates

Each component provided in the system is an instance of a component template ('template'), which defines what attributes and sub-components the component possesses. Component templates are defined hierarchically in the system, with more generic components at the top of the hierarchy (e.g. LAN Equipment, Peripheral Equipment), and increasingly specific components moving down the hierarchy (e.g. particular brands and models of routers).

Attributes can be defined at each level in this hierarchy, and these attributes inherited by members lower in the hierarchy. For example, a serial number attribute can be attached to the top of the components hierarchy, allowing a serial number to be defined for all components, whereas network address attribute can be allocated to LAN equipment, allowing the addresses to be specified only for LAN equipment and sub-types where it would be appropriate. Attributes are user-definable, and can be constrained to a particular length, format, subset of characters or selection list.

Each component template can also define one or more 'sub-components', which are links to other component templates that can be physically contained within the component. For example, a PC may contain a LAN card, a PABX chassis may contain one or more analogue telephone cards. Furthermore, the sub-component may also contain further sub-components; for example, a LAN switch chassis may contain a LAN card, which in turn contains 24 LAN ports.

The maximum, minimum and default number of sub-components may be specified. When an actual component of a particular template is created, a series of dialogue boxes ('wizards') will prompt the user for the names, types and number of sub-components required.

Managing Components

Information about the components is presented, in the preferred embodiment, in the form of an Explorer™ interface, which allows components to be selected by location ('space'). Components are selected by 'drilling down' through a hierarchy of spaces, i.e. starting with a generic space, and opening links to increasingly more specific spaces.

An item of equipment may consist of several levels in this space hierarchy, for example, a PC may contain a LAN port (two levels in the hierarchy), or a PABX chassis may contain an analogue extensions card, which in turn contains 20 analogue extension ports (three levels in the hierarchy).

The multiple levels in the hierarchy for an item of equipment are constrained by the sub-component definition for the corresponding component template. During creation of a component, the system will check for any defined sub-components for the component template, and will prompt the user to create these sub-components via a series of dialogue boxes ('wizards'). The user must define at least the minimum and at most the maximum number of each sub-component defined for the template.

In the case where the sub-component contains further sub-components, multiple wizards may run to complete the addition of the new piece of equipment.

In addition to constraints checking for sub-components, the system will also check the component above in the hierarchy (the 'parent component') to ensure the component being added is within the constraints set by the parent component's template definition.

The wizards allow a number of components with a range of names to be created. The range can be specified as 'Name From' and 'Name To' and the system iterates through the range of names, changing one or more numbers and letters, working from the right of the name string to the left, to create all the intermediate names. The wizard can be called automatically for sub-component creation, but can also be called manually to create multiple items of equipment with a range of names.

Managing Connections

The basic unit of connectivity recorded by the system is port to cable to port. However, port to cable connections without a connection to a second port are permitted to record real world situations where connections between equipment may not be complete.

This also allows a novel approach to recording connections where a connection between two pieces of equipment can be inferred by recording the port to cable connection for each end of the cable, and matching the cable identifiers. This approach is used by the system to record and audit connections in a patch panel, where it is difficult to trace the physical paths of the cables in order to determine which ports are connected together.

The majority of ports and cables in the infrastructure, especially frequently changed components such as patch panel ports and patch cables, are fitted with machine-readable identifiers, such as bar-code labels. The handheld device includes a machine-readable identifier reader such as a bar-code scanner to allow changes to connections to be recorded quickly and accurately. Changes to connections then involve scanning the identifiers of the port and/or cable and choosing to connect or disconnect.

For cases where it is impractical to add machine-readable identifiers to the ports and cables, or for infrequently changed cables, the system allows the ports and cables to be selected from a drop down list. A single machine-readable identifier can be added to a range of ports, such as a single bar-code for a 24 port hub, which allows the user to select the correct port from the range of 24.

The preferred system uses a combined connection and disconnection screen ('connections screen') to allow connections to be changed efficiently. The screen includes fields for 'Connect From Port' and 'Connect To Port' as well as cable field. The screen allows either a single port to cable connection to be scanned and connected, or a full port to cable to port connection to be recorded.

To support the large numbers of fixed or seldom changed connections between communications equipment and patch panels, outlets to patch panels and backbone connections, the system preferably includes a batch connection screen. This allows a space and a range of ports names to be specified in the Connect From and Connect To fields. The system then iterates through the range of names, changing one or more numbers and letters, working from the right of the name string to the left, to identify all the intermediate port names.

If the numbers of ports in the Connect From and Connect To ranges are the same, each port in the Connect From space will be connected to its counterpart in the Connect To space. The system will automatically create cable records, for each connection between ports; these cable records will be deleted when the connections are broken (which may also be done via a batch disconnection).

The system can constrain connections between ports and cables based on the performance of the cable ('Category') and the type of communications signal to be passed through it ('Application'). The system has a definition screen which allows constraints between Applications and Categories to be defined, and a maximum allowed end-to-end communications equipment to workstation equipment ('Channel') length to be specified for each combination. Each equipment port is assigned an Application, and each cable and intermediate connection port is assigned a Category.

When connections are made between cables and intermediate connection ports of different categories, a warning is given. If connections are made between cables and equipment ports where the Category of the cable does not support the equipment port Application, an error is given. Finally, when a channel is completed, the overall length of the channel is calculated and an error is given if it exceeds the maximum for the Category and Application, or if the Applications on the peripheral equipment and communications equipment are different.

Managing Multiple Connections

In the event of fixed cabling, such as horizontal cables between patch panels and outlets, backbone cabling between two patch panels and equipment cabling between communications equipment and patch panels, a large number of connections must be made between ports often having the same names, or in any event having a contiguous range of names, in the patch panel and remote location.

To support this, the system allows multiple connections to be made or broken between two sets of ports with ranges of contiguous or related names in two different spaces. The ports can be located at different levels in the space hierarchy at the patch panel and remote space.

For example, ports in a selected patch panel may reside in different verticals (first level of hierarchy) and different horizontals within those verticals (second level of hierarchy). The system will match a range of port names at any level in the hierarchy of the selected spaces in order to identify the connections to be made or broken.

Viewing Connections

The preferred system provides a browser to view connections in the system. The user can select equipment or intermediate spaces and request to view all channels terminating at, or passing through the space.

The system preferably records all connections in the system, including fixed and infrequently changed cabling. This has the advantage of providing additional troubleshooting and reporting information to the user, with the downside that a large amount of seldom-referenced information is displayed.

The preferred solution is to allocate a 'Detail Metric' to each cable and port, based on its likelihood of being changed and therefore its importance to the cabling engineer. The cabling viewer also includes a 'Viewing Detail' level. If the Detail Metric of the cable or port is less than or equal to the Viewing Detail (indicating it is of significance), then the port or cable will be displayed.

Viewing of channels can be filtered to show patch by exception, critical channels and incomplete channels.

Patch by exception channels indicate that an outlet is permanently patched to provide a service, irrespective of whether workstation equipment is connected. This method is used by some organisations to reduce the number of moves, adds and changes. Channels can be marked as patch by exception by setting a flag in either the communications or workstation equipment ports.

Likewise, certain channels can be marked as "Critical" by setting a flag in either the workstation or communications equipment ports. Viewing critical channels is useful in that these must be the first ones to be replaced in the event of communications equipment failure. A warning is presented to the user if any changes are made to channels marked as critical.

Incomplete channels are defined as channels that do not terminate at both ends in an equipment port. However, there are different 'levels' of incompleteness, depending whether the channels are patched with a frequently-changed patch cord (likely to be an patching error), or the communications equipment is simply unused. The system allows the use of the Viewing Detail to provide this detail of viewing of incomplete channels. Incomplete channels that do not contain a cable with a Detail Metric less than or equal to the Viewing Detail are not displayed in the incomplete channel view. Patch by exception ports are also filtered from the incomplete channel view.

Auditing

The system is dependent on connectivity records being accurate and up to date. The Audit screen allows actual connections to be checked periodically against the system recorded connections.

An audit summary screen shows by space what percentage of ports have been audited within a specified period, for example 1 month, to allow the cabling engineer to determine which spaces need auditing. Typically, only frequently changed connections are audited since these are the ones most likely to be changed erroneously, and fixed cabling is often hidden beneath raised floors or false ceilings. To support this, once again, the Audit screen supports the concept of a Viewing Detail to select only the frequently accessed ports for audit.

The basic unit of audit is port to cable, rather than port-cable-port. This allows means for auditing patch panels, where it has been conventionally difficult and very time consuming to trace cables from port to port. Instead, the user scans the machine readable identifiers on each port and any connected cable for each port in the patch panel. The system will then tally the unique cable identifiers on each patch cable to determine which ports are connected.

Table 1 below shows the principle, where the connection between Switch 12-02 and Outlet 18-234 are inferred by matching the cable identifiers after scanning each port and cable in the patch panel.

TABLE 1

| Space | Port | Cable |
|---|---|---|
| Vertical A/Horizontal 1 | Switch12-01 | 294722 |
| Vertical A/Horizontal 1 | Switch12-02 | 234893 |
| Vertical A/Horizontal 1 | Switch12-03 | 234833 |
| Vertical A/Horizontal 1 | Switch12-04 | |
| Vertical A/Horizontal 1 | Switch12-05 | 123901 |
| Vertical A/Horizontal 1 | Switch12-06 | 438283 |
| . | . | . |
| . | . | . |
| Vertical B/Horizontal 3 | Outlet18-233 | 483929 |
| Vertical B/Horizontal 3 | Outlet18-234 | 234893 |
| Vertical B/Horizontal 3 | Outlet18-235 | |

TABLE 1-continued

| Space | Port | Cable |
| --- | --- | --- |
| Vertical B/Horizontal 3 | Outlet18-236 | 239489 |
| Vertical B/Horizontal 3 | Outlet18-237 | 233231 |
| Vertical B/Horizontal 3 | Outlet18-238 | 239429 |

The system can either rely on the user scanning the port and cable connection, or alternatively can prompt the user for each port that has not yet been audited. This latter feature can be used after auditing a space to identify any remaining unaudited ports in the space.

On completion of the audit, the user can review each audit discrepancy to decide whether the audited result or the previously recorded connection were accurate.

Work Orders

The system preferred includes a work order management system that can be used to assign work to an engineer. All moves, adds and changes can be linked back to a work order, to allow a review of what changes have been made so far and what changes are pending for a piece of work, and to keep a record of why each change was made.

Work orders are created with an earliest start date and latest completion date, and the cabling engineer has an opportunity to schedule the work to a particular date and time between these. The system will notify the engineer when the work order is due, and will alert the engineer when a work order is past its latest completion date.

Work orders can be defined by making 'pending changes' to equipment or connections on the desktop system. Details of the changes are recorded and passed to the engineer, in the form of a work order, for action.

Work orders are initially placed in an 'Unassigned' folder on the system. This allows a manager to assign work orders to engineers as required, or allows co-operative sharing of work orders between engineers, who can select work from the unassigned folder. Work orders cannot be moved back to the unassigned folder by the engineers, however they can choose to Reject the work, in which case they have to enter a reason.

Work orders can be grouped by projects, which have a specified duration. The system allows equipment to be reserved for projects, which ensures it cannot be assigned to any other projects. The system includes a sophisticated search screen which can be used to find equipment unassigned for the required period, containing very specific features as defined by their attributes.

Work order details and scheduling capabilities are available on the handheld device, and can be dispatched from the desktop system to the handheld device so that new work orders can be assigned to and actioned by users who are away from their desk.

Links to Active Equipment

The server can be configured to regularly poll PABX's, LAN switches and other active communications equipment in order to retrieve information about the configuration and status of active communications ports. The interface is preferably via a TCP/IP connection (local area network or wide area network) for TCP/IP-capable equipment, or serial connection from a workstation or server for active equipment with a serial connection.

The preferred protocol to use to obtain configuration and status information over TCP/IP is the Simple Network Management Protocol (SNMP—RFC 1157). For LAN Switches, the SNMP Bridge MIB (RFC 1493) can provide information on the MAC address connected to the or each port.

The interface highlights the last change in configuration of the communications equipment, as well as the configuration or status of the or each port on the communications equipment, and the time of the last change. This information can be used to alert the user to an unplanned change to connections (those that were not previously recorded in the connectivity database). An example is a change to the MAC address connected to a port of a LAN switch, which indicates peripheral equipment such as a PC has been moved.

These alerts can be converted into work orders to investigate the change, or to automatically update the connectivity database.

The information is preferably synchronised with the handheld device as simple attribute information.

Wireless Diagnostics

Wireless-equipped handheld devices are able to diagnose problems in real time when attempting to troubleshoot problems. This includes sending a TCP/IP ICMP packet ('pinging') a TCP/IP connection when making changes. This allows the cabling engineer the ability to swap cabling components and determine immediately whether the change was successful in resolving the problem.

Furthermore, the system allows active equipment to be accessed either by TCP/IP or serial connection (via an intermediate PC). The access can either be to view the current configuration for the communications equipment, or to change the configuration of the component.

Referring now to FIG. 1, there is shown in detail the preferred embodiment of database structure for the system. The database is formed of a plurality of tables, the details and purpose of which as follows.

Database Set-Up

COMPONENT

This contains records of all the communications equipment, peripheral equipment, cables, ports and other physical items that make up the infrastructure (components), and where the component is located in space.

TEMPLATE

This records component templates and their position in the hierarchy of component templates.

ATTRIBUTE

This contains a full list of the attributes that can be contained by a template or component, including their type, defaults and constraints.

ATTRIBUTE_SELECTION

This is a list of permissible options for an attribute in a drop-down list if the attribute is a selection.

TEMPLATE_ATTRIB

This records the attributes associated with a particular template, as well as defaults and flags indicating whether they are mandatory, system defined etc.

COMPONENT_ATTRIB

This records the attributes associated with a particular component along with their values. The list of attributes and defaults are copied from the template for the component at component creation time, and are updated in the event that the template is changed in the future.

CONNECTION

This contains a list of cables/connections in the system. A cable contains two ends (NODE_A and NODE_B) which can refer to the ports to which they are connected (actual ports are recorded as a record in the COMPONENT table).

APPLICATION_CATEGORY

This records the permissible length for each category of cable and application that runs over the cable. Categories and applications are defined as select type attributes.

SUBCOMPONENT

This defines the sub-components that can be contained by a component. The sub-components are logically grouped to restrict the total numbers of a group of related sub-components. This information is stored in the SUBCOMP_GROUP table.

SUBCOMP_GROUP

This records the maximum and minimum numbers of a group of related sub-components that can be contained within a component.

AUDIT_DISCREPANCY

This records any ports where the audited port to cable connection does not match the system recorded connection.

HISTORY

This records the history of changes to components and connections.

SEC_TBL_USERS

This is a table containing user login details.

WO_*

This represents work orders and related tables.

The primary keys for COMPONENT, TEMPLATE and CONNECTION are surrogate (serial) keys (the ID field), since it is not possible to guarantee the uniqueness of component and template names. This concept of ID is carried through to the remaining tables, since it simplifies the replication of data between handheld and desktop devices (a single ID attribute is needed to uniquely identify any row in any table).

Hierarchical components by space and templates by type are supported through self-referencing database tables via the attributes 'space' and 'parent' respectively.

The display of Components shows a system defined 'All Spaces' component at the top of the tree and by default displays the first level of space by displaying all those components whose space ID is equal to 'All Spaces'. Subsequently, when the explorer window is opened up another level, the components it contains are identified as those whose space is equal to the expanded node of the tree.

Similarly, for the Templates view, a system defined 'All Templates' entry is shown at the top of the tree, with the 'parent' attribute being used to open up subsequent levels of templates.

Care is taken in the case of these self-referencing entities to ensure that entities lower in the hierarchy do not reference those higher up, which can result in circular references.

Connections between ports and cables in the system are recorded in the CONNECTION table. The actual cable is represented by an item in the COMPONENT table so that it can support templates and attributes (such as cable length) the same as all the rest of the components in the system. The CONNECTION table is linked to the cable component via the ID, and is used to record the connection of the cable with up to two ports (using the NODE_A and NODE_B attributes—these also relate back to the COMPONENT records for the ports).

Ports in the system may either by equipment ports, such as a port in a LAN Switch, or intermediate ports such as patch panel ports or wall outlets. The system distinguishes these via a 'connectivity metric' number assigned to each port, which determines how many cables can be connected to it. Generally, equipment ports have a connectivity metric of one, whereas intermediate ports have a connectivity metric of two (generally a fixed cable is connected behind the port, and a changeable one in the front).

A channel can be displayed for a single terminating port (peripheral or communications equipment) or for an intermediate port. In order to display the channel for a terminating port, the system identifies any CONNECTION records with NODE_A or NODE_B equal to the port identifier. The system then identifies if there are any other CONNECTION records with identifiers equal to the value of the opposite node. If there are, the system repeats the operation until a complete map of the channel is identified. To avoid circular references, and to avoid back-tracking along the same channel, the system will not follow nodes already seen.

In order to identify channels for intermediate ports, the system follows the NODE_A connection until the end of the channel is identified (there are no other CONNECTION records with NODE_A or NODE_B equal to the identifier of the terminating port). The system then maps the channel from this terminating port as per the previous algorithm.

Multiple channels can be displayed for a space containing equipment ports or intermediate ports. In this case, all ports in the space, or any child spaces are first identified. The channels for each of these ports are identified using the preceding algorithms, and are displayed.

Duplication of channels is possible in this process, as the channel may pass through the space or one of the child spaces more than once. Duplicates are NOT eliminated as this may mistakenly indicate to the user that the channel is absent; instead one level of space is included in the tree-view display of connections to distinguish between the duplicate views of the channels.

Not all intermediate points in the channel are displayed by default, as many connections are fixed and of little interest to network engineers. Each port and cable is assigned a 'detail metric' at entry time that indicates its significance—that it the frequency in which it is changed. The system supports a 'viewing detail', and ports and cables with detail metric less than or equal to this viewing detail (indicating they are more important) are displayed. The exception to this is incomplete channels (where the channel terminates in an intermediate port). These ports are always shown at any detail level.

At the ends of complete channel, the container of the terminating point is displayed (at any viewing detail level). This is used to provide an intuitive display of which communications equipment is connected to which peripheral equipment.

The system allows filtering to show only incomplete channels, and ports marked as 'patch by exception'.

Patch-by-exception channels are those which remain intentionally patched, providing a service to an end-user outlet irrespective of whether peripheral equipment is connected to the outlet. Patch-by-exception channels are used by some companies to reduce the amount of patching required to support basic services such as voice and LAN, since connection to these services then only requires connecting the peripheral equipment to the outlet. Patch-byexception channels are indicated by flagging the outlet port with a patch by exception attribute. The patch-by-exception filter shows those patch-by-exception channels which are also incomplete channels, since the intention is to show which outlets are available for connection to peripheral equipment.

Incomplete channels are those which terminate in ports which have a number of cables less than the connectivity metric of the port or terminate in a cable which only has one node connected to a port. Incomplete channels are only shown by the incomplete channel filter if they are not marked as patch-by-exception, since the intention is to identify those connections which may have unintentionally been left connected after removal of the peripheral equipment.

The preferred connections screen is optimised to support rapid connections and disconnections, as it is essential that engineers are not hampered when recording changes to connections, otherwise they may not keep the records up to date. The user usually scans the machine-readable identifier for the Connect From Port. The system then updates the screen depending on any existing connections, and moves the cursor to the appropriate field for the next action as detailed in Table 2 below.

TABLE 2

| Cable | Connect To | Description |
|---|---|---|
| No | No | User is going to connect to a Cable and optionally the Connect To port. Move the cursor to the Cable field. |
| Yes | No | User is going to connect to a Connect To port. Populate the Cable field. Move the cursor to the Connect To field. |
| Yes | Yes | User is going to disconnect the Connect From Port. Leave the cursor in the Connect From field. |

The Disconnect button on the connections screen will delete the port to cable connection. Again, this is optimised to permit a disconnection of a cable from a port followed by a reconnection to another port. Table 3 below indicates the action taken when the disconnect button is pressed.

TABLE 3

| Connect From | Cable | Connect To | Cursor | Description |
|---|---|---|---|---|
| Yes | Yes | Yes | Connect From | Connect From port to cable record deleted. Cursor remains in Connect From field in case user wishes to connect the cable to another port |
| Yes | Yes | Yes | Connect To | Connect To port to cable record deleted. Cursor remains in Connect To field in case user wishes to connect the cable to another port |
| Yes | Yes | Yes | Cable | Both Connect From Port to cable AND Connect To Port to cable records deleted |
| No | Yes | Yes | Anywhere | Connect To Port to cable record deleted. Cursor moves to Connect From field. |
| Yes | Yes | No | Anywhere | Connect From Port to cable record deleted. Cursor moves to Connect From field. |
| Yes | Yes | No | Anywhere | Connect From port to cable record deleted. Cursor moves to Connect From Port field. |

The result of this logic is that pressing Disconnect once will generally disconnect the port just scanned, and pressing it a second time will disconnect the second port. Also, scanning one port and disconnecting it will leave the system in a state to immediately scan a second port for reconnection. This is optimised for recording changes to patch panels where this action is common.

To make or break multiple connections, the system is presented with two spaces containing the ports to be connected, and a range of port names for each space.

The system traverses down the hierarchy of spaces to identify a complete list of ports to be connected, and discards any outside the name range presented. The ports are sorted alphabetically for both spaces.

If the numbers of ports are identical, the system checks the categories of the components being connected, and whether any ports are fully connected and warns of any discrepancies (in the case of making connections). If the user chooses to proceed, the port connections are made or broken.

Attributes are recorded in the ATTRIBUTE table, which provides the facility to define their name, description, type and special information, such as whether they are mandatory, system defined. The ATTRIBUTE_SELECTION table records entries for selection type (drop down menu) attributes.

These are linked to templates via the ATTRIBUTE_TEMPLATE link table; one row in this table indicates the presence of an attribute in a template, and its default value (if any) which overrides the ATTRIBUTE table default.

Attributes are linked to component records via the ATTRIBUTE_COMPONENT link table; one row in this table indicates the presence of the attribute in a component and its assigned value. The default value for the component is copied at component creation time from the value of the attribute in the ATTRIBUTE_TEMPLATE table.

When attributes are changed, for example adding or removing a selection criteria, changing the type of an attribute or deleting the attribute, the ATTRIB_COMPONENT record for all components and the ATTRIB_TEMPLATE for all templates are updated accordingly. Likewise, when a change is made in ATTRIB_TEMPLATE, changes are made to all of the ATTRIB_COMPONENT records in order to keep the actual component in line with the template.

Sub-components are defined for a template to constrain the minimum and maximum number and types of a sub-component that can be contained within a component, and to provide default names, types and numbers for the addition of components using the wizards.

Sub-components are combined into groups of related sub-components having a combined minimum and maximum allowable number. Details about the sub-component groups are stored in the SUBCOMP_GROUP table, and details of the actual sub-components are stored in the SUBCOMPONENT table.

No two groups can contain the same sub-component as this would make sub-component constraints checking unreliable (see later). Furthermore, sub-components cannot be of the same type as the parent component, nor can any further sub-components be of the same type as the component, as this would result in a circular reference which would result in uncontrolled addition of sub-components.

The group definition can indicate that a wizard should be run to allow interactive choice of the number and type of sub-components of the group, and the names for each sub-component. The group definition furthermore includes flags to indicate the default naming conventions for the sub-components, for example whether they should inherit their names from the parent components with a configurable separator character such as a hyphen.

The information stored within a sub-component definition is as follows:

TABLE 4

| Table | Field | Description |
| --- | --- | --- |
| SUBCOMP_GROUP | NAME | Name of the sub-component group. This is used as the default name of the sub-component in the event that Inherit Names is set to No |
| SUBCOMP_GROUP | MIN | Minimum number of items of this type permitted |
| SUBCOMP_GROUP | MAX | Maximum number of items allowed |
| SUBCOMP_GROUP | WIZARD | Identifies whether the Add Subcomponents Wizard should be run for this group |
| SUBCOMP_GROUP | INHERIT_NAME | Identifies whether the sub-component should inherit the name from the parent component. |
| SUBCOMP_GROUP | RESTART_NUMBERING | Indicates whether the default sequence number of the sub-component should restart at 1 for each parent component added. |
| SUBCOMPONENT | TEMPLATE | Pointer to the template for the permitted sub-component. One or more SUBCOMPONENTS can be related to a SUBCOMP_GROUP. |
| SUBCOMPONENT | DEFAULT | Default number of this component to be added in the event that the wizard is not run. |

For common components when the name and number of sub-components is well known, the group definition can specify that the wizard does not need to be run. For example a 12 port hub requires that 12 sub-component ports must be created, with port names that follow the hub name with 01 to 12 appended. To facilitate this, the sub-component definition also includes a default number of each sub-component so that the correct number of sub-components are created when the wizard is not used.

The Wizards employ an algorithm to 'guess' the names and numbers of the components being added, so that in the majority of cases it is not necessary to change any of the defaults in the wizards. The wizards present three questions for each group of sub-components to be added:

1. N—Number of sub-components to be added
2. T—Type of sub-component (more than one sub-component may be defined for a group)
3. NF and NT—Range of names for sub-components (Name From and Name To)

Questions 2 and 3 will be repeated if the range of names between the NF and NT is less than the number of sub-components for this group.

Questions 1 to 3 may be repeated if the components being added are sub-components of another sub-component. For example, in the case of an equipment chassis containing equipment cards which themselves contain ports, questions 1 to 3 will be repeated for each of the equipment cards in order to define the port names and types.

The following logic is applied for the defaults for N, T, NF and NT (arithmetic applies only to the numeric suffix of NF and NT, with the base-name remaining unchanged):

1. The first time a group is added, N defaults to 0, T has no default, NF defaults to the parent component name with a suffix of 1 and NT defaults to the parent component name with a suffix of N.
2. If NF is changed to a new and different suffix (NNF), NT defaults to NNF+N
3. If NT is changed to a new smaller suffix (NNT), N is decremented by the number of names in the range NF to NNT. Questions 2 and 3 will be repeated with T defaulting to the previous value, NF defaulting to NNT+1 and NT defaulting to NNT+N. This is repeated until N is zero.
4. If a second identical group is subsequently added as a result of the parent being itself a sub-component, N will default to the previous N and T will default to the previous sub-component type. NF will default to the parent sub-component name with a suffix of 1 (if restart numbering is indicated for this sub-component) or the previous value of NT+1 (if numbering is not restarted). NT is set to NF+N.

The sub-component groups define constraints for subsequent additions of a sub-component to a component.

When a new sub-component is added to a component, its type is checked against the list of sub-components defined for each group of the component. If there is no match, the new sub-component cannot be added to the component.

If there is a match, the system calculates the number of sub-components for this group already existing within the component. If addition of the new sub-component would increase this number such that it is greater than the maximum for this group, the addition is not allowed. Note that no two groups can contain the same sub-component, as this would make the system unreliable in determining which group the new component belongs to.

Structured cabling standards such as TIA/EIA568 define standards for cable and channel lengths for particular applications over a category of structured cabling components. The system calculates total channel length and categories of connectivity components in the channel to prevent unsupported connections.

Applications and categories are stored as normal system attributes in the ATTRIBUTE table, with the values stored as in the ATTRIBUTE_SELECTION table. A record is entered in the APPLICATION_CATEGORY table for each application that is supported of each category of cabling; this record also defines the maximum channel length.

When making a connection, the system checks the ports and cables are of the same category otherwise the connection is not allowed.

When completing a channel, the system additionally checks the applications of the equipment ports at either end of the channel to ensure that they are identical. Finally the system checks the maximum channel length for the application and category and disallows those which are over the maximum channel length.

The audit summary screen shows the number of ports in a space that have not been audited within a specified period, for example 1 month, to determine which ports are most likely to be out of date. This is implemented by an AUDIT_DATE field contained within the COMPONENT record which indicates the last date the port was audited.

The audit summary screen also makes use of the detail metric of each port and a viewing detail parameter of the audit summary screen to prevent frequent auditing of fixed connections that are infrequently changed. Ports that have a detail metric below the audit summary screen viewing detail are not counted as ports that require auditing.

When a port to cable connection is scanned during the audit process, the system checks for any CONNECTION records that have NODE_A or NODE_B equal to the component ID of the port. If the record exists, the AUDIT date on the port is updated to the current date. If not, an entry is made in the AUDIT_DISCREPANCY table, identifying that the connection of the port must be reviewed upon completion of the audit.

If a port to port connection is audited (without a cable identifier), the system confirms that a CONNECTION record exists with NODE_A equal to one of the ports, and NODE_B equal to the other. In the case that the record does not exist, both ports are recorded in the AUDIT_DISCREPANCY table for later review.

If a port to cable to port connection is audited (with a cable identifier), either port that does not have a matching CONNECTION record is recorded in the AUDIT_DISCREPANCY table.

Ports may additionally be recorded as free, in which case the system confirms that the number of CONNECTION records with NODE_A or NODE B equal to the component identifier of the port is less than the connectivity metric of the port. If this is not the case, the port is recorded in the AUDIT_DISCREPANCY table.

The preferred embodiment of system records a full history of moves, adds and changes that can be accessed from the work orders module to identify a list of changes made to components any connections. Changes can be related back to work orders and the engineer who made the change.

The change history details are stored in the HISTORY table. The date and time of the change, the engineer making the change, any related work order and a description of the change is stored in each record.

Table 5 indicates the text logged in the history table for a change to components and connections

TABLE 5

| Type of change | Description logged in HISTORY table |
| --- | --- |
| Move component | Move <component type> <component> to <space> |
| Connect component to cable (2 records for port-cable-port connection) | Connect <component type> <component> to <cable> |
| Disconnect component from cable | Discon <component type> <component> from <cable> |
| Change component attribute | Change attribute <component> <attribute name> to <new attribute value> |
| Change component type | Change type <old component type> <component> to <new type> |
| Rename component | Rename <component type> <old component name> to <new component name> |

The system can be configured to download configuration and status information from active equipment such as network switches and PABXs. The system would rely on a server process that periodically connects to the active equipment, either via TCP/IP or serial connection, in order to download the information. The information is extracted and updates the equipment attributes so they can be displayed on the desktop and handheld system.

The interface process identifies which active components should be accessed by looking at the COMPONENTS table. Those including an active update flag are accessed one after the other to download the information.

The templates for these components contain a reference to a script file, which is used by the process to identify the sequence of commands to be sent to the device and received from the device in order to extract the data. The script file also identifies where to access the attribute details from the received file and which attributes they should be assigned to in the component.

The wireless diagnostics feature of the preferred embodiment stems from the wireless LAN connectivity of the handheld. The option is accessed from a menu option on the handheld when the item of equipment is displayed. The handheld identifies the IP address of the device if specified in the attributes for the component, or allows the user to specify an IP address, and uses this to ping the device so that successful changes to patching or replacement of affected components can be identified immediately.

The system also allows active components to be accessed by TCP/IP to provide up to date configuration and other details, and to allow limited changes to be made to the active component. The system operates as a simple Telnet client, which has soft-configurable function keys that send a sequence of commands, and wait for a sequence of responses from the equipment. This can be used as a short-cut for logins and other common activities.

Definition of Terms

| | |
| --- | --- |
| Active equipment/component | Communications or peripheral equipment that requires power to operate. Examples are a LAN hub, a PABX or a desktop PC. |
| Application | A telecommunications protocol running over a structured cabling system. An example is 100BaseT. |
| Attribute | Property of a piece of equipment. E.g. telephone number for voice equipment, network and subnet for a hub |
| Audit | The process of confirming the physical infrastructure matches the configuration recorded in the system. |
| Audit discrepancy | List of deviations between the physical infrastructure and that previously recorded in the system. |
| Backbone cable | Cabling used to connect one communications area with another, typically terminating in a patch panel or distributor in each area. Commonly consists of twisted pair cabling for voice connections and fibre-optic cabling for data. |

-continued

| | |
|---|---|
| Batch connection/disconnection | The process of making or breaking multiple connections in the system from a single user-process. |
| Category | Describes the performance category of cables and their ability to support various telecommunications applications. Examples for unshielded twisted pair cable are Cat 5, Cat 5e and Cat6. |
| Channel | The structured cabling infrastructure that links the communications equipment with the peripheral equipment. Includes equipment cables, cross-connects, patch cords, horizontal cabling, consolidation points and work area cables. |
| Circular reference | Linked items which directly or indirectly relate back to themselves. In software, this can result in an infinite loop and software failure. In the system, circular references must be avoided in the Space hierarchy, Component template hierarchy, channel connectivity and sub-component definitions. |
| Communications equipment | Equipment such as modems, multiplexers, communications controllers and PABX's |
| Component | Communication equipment, peripheral equipment, ports, cables, outlets, interface cards and spaces. Basically everything in the IT infrastructure or anything that connects to the IT infrastructure. |
| Component template | Template used to create a Component in the system. The template defines the attributes and sub-components of the component. |
| Connections screen | Screen in the system that displays channels for a port or space. Also permits connections to be made and broken. |
| Connectivity constraint | In the system, prevents ports and cables of different types from being connected together. Additionally ensures that channel lengths fall within structured cabling standards, and that compatible applications are used at the ends of the channel. |
| Connectivity metric | Identifies the number of cables that can be physically connected to the port in the system. Typically communications equipment and peripheral equipment ports have a connectivity metric of 1, whilst interconnection points such as outlets and patch panel ports have a connectivity metric of 2. |
| Cross-connect | Connection of equipment is extended to one side or part of a cross connecting patch panel which is then patched or cross connected to the horizontal cabling part of the distributor or cross connect panel. |
| Detail metric | Attribute of a cable or port in the system. Indicates the likelihood of the cable or port being changed. Lower numbers indicate more likelihood of being changed, whereas higher numbers indicate fixed connections unlikely to be changed. |
| Dialogue box | Form in the system that presents an interface for data entry or presentation of data. |
| Equipment cable | Fixed cabling used to connect communications equipment to a patch panel. |
| Horizontal | Patch panel connector mounted on a Vertical that generally houses one or more interconnection points. Typically used in pair manageable patch panel hardware. |
| Horizontal cable | Fixed cabling that links the patch panel with the work-area outlets. |
| Hub | Communications equipment used to present a LAN service to peripheral devices. May be passive or switched. |
| Incomplete channel | In the system, a channel that ends in a port connected to a number of cables less than the connectivity metric, or a channel that ends in a cable rather than a port. |
| Infrastructure | All components pertaining to and connected via a structured cabling system, including backbone and horizontal cabling, cross-connects, fixed cabling, communications equipment, peripheral equipment and other passive and active components. |
| LAN equipment | Includes the LAN Switches, Hubs and any special type of LAN cabling that facilitates the inter-connection of peripheral devices |
| MIB | SNMP Management Information Base. A database of attributes and values that correspond to the device being managed. |
| Moves, adds and changes | Common term for any movement, addition or change of or to a telecommunications (voice and/or data) service. |

-continued

| | |
|---|---|
| | This may entail the relocation of a PC device or printer or telephone. It may also be the reprogramming of a telephone (e.g. to alter its permissions to say be able to call IDD.) |
| Multiple connection/disconnection | See batch disconnection/connection. |
| PABX | Communications equipment used to provide voice services to end users. |
| Parent component | Equipment or space in which a component resides. |
| Patch-by-exception | The process of reserving certain work area outlets for common applications such as voice and LAN. Patch by exception channels are intentionally patched to present a service to an outlet irrespective of whether any peripheral equipment is connected to the outlet. |
| Patch panel | A group of terminations within a panel that is suited to be mounted within a communications rack, cabinet or wall mounted. The patch panel presents the communications equipment ports, outlets and backbone connections in a manner than can easily be interconnected. |
| Peripheral equipment | A device which is generally connected to the work area outlet/connectors. Equipment such as printers, PCs, laptops, telephones, modems. |
| Ping/pinging | An IP (TCP/IP) ICMP packed, used to check network connectivity between two IP-capable devices. |
| Port | A physical connection point in a piece of communications equipment, peripheral device or passive equipment. The connection in active equipment may be an electrical or optical connection and in passive equipment it is a connection point. |
| Primary key | Unique and primary identifier for a row in a relational database. |
| SNMP | Simple Network Management Protocol. Defined in Internet Engineering Taskforce RFC 1157. |
| Space | A space is an area used for locating the installation and termination of telecommunications equipment and cable. E.g. common equipment rooms, equipment rooms, telecommunications closets, false floor and false ceiling spaces, work areas and maintenance holes/hand holes. |
| Structured cabling | A Structured Cabling System is a cabling system which supports both voice and data communications and is designed in a standards compliant manner to ensure applications have connectivity to the voice and/or data network. |
| Sub-component | A component contained within another. Sub-components can contain further sub-components. |
| Sub-component group | A set of related sub-components that combined have a minimum and maximum constraint. The sub-component group in the system also defines default naming conventions for the sub-components and whether to run a wizard to define sub-component names, types and numbers. |
| Surrogate key | Sequence number commonly used to uniquely identify a row in a relational database when no natural combination of columns uniquely identify the row. |
| Template | See Component template |
| TCP/IP | Transmission Control Protocol over Internet Protocol. Common transport protocol used on the Internet and between many peripheral and communications equipment. |
| TIA/EIA568 | U.S. base standards organisation - Telecommunications Industry Association/Electronics. TIA/EIA568 is a structured cabling standard which dictates how to engineer a structured cabling installation. The previous 'A' standard has recently been superseded with the 'B' standard. |
| Vertical | Vertical mounting used to hold patch panel horizontals. Typically used in pair-manageable patch panel hardware. |
| Viewing detail | Used in conjunction with the Detail Metric to determine whether a port or cable in the system is significant enough to be displayed in the channel view. Ports and cables with Detail Metric greater than the connectivity metric are not shown unless the channel is incomplete. |
| Wizard | Series of dialogue boxes used to prompt the user to enter a structured set of data. Used in the system to prompt the user to enter the number, types and range of names for sub-components. |
| Work order | Definition and description of a unit of work assigned to an engineer. May include trouble tickets, moves adds and changes, audits and other activities. |

The invention claimed is:

1. A method of managing a cabling system comprising the ordered steps of:
   first, providing one or more cables with a machine readable identifier; and providing one or more locations with a machine readable location identifier;
   then, locating the cable or cables at one or more of said locations; and,
   thereafter, reading by machine said cable identifier or identifiers and said location identifier or identifiers, generating a list of cable locations based on the read identifiers and storing said list for later retrieval.

2. The method of claim 1, wherein the or each cable is provided with a cable identifier at each terminal thereof and the list generated includes data for determining cable connections from the cable identifiers.

3. The method of claim 1, wherein the or each cable is provided with the same identifier at each of its terminals.

4. The method of claim 1, including the step of providing a hand-held device for machine reading the cable and location identifiers.

5. The method of claim 4, including providing a central processor connectable with the hand-held machine for the download of read identifiers, a master list being stored within the central processor.

6. The method of claim 5, including providing a connection of the hand-held machine to the central processor which is wireless.

7. The method of claim 1, including the step of identifying components from the cable and location identifiers, the list including data relating to the components and thereby of the connections between components.

8. The method of claim 1, including the step of identifying changes that have occurred in the recorded connections within a specified period of time.

9. The method of claim 1, including the step of integrating data and voice configuration information into a structured cabling and equipment browser to provide a single view of all information related to the structured cabling channel and services provided.

10. A cabling management system comprising a machine readable cable identifier for use with one or more cables, a machine readable location identifier for use at one or more locations, an identifier reading device operable to machine read said cable identifier or identifiers physically applied to a cable or cables and said location identifier or identifiers physically applied to a location or locations and to generate a list of cable locations based on the read identifiers, and machine readable memory means operable to store said list for later retrieval.

11. The system of claim 10, wherein a cable identifier is provided at each terminal of a cable and the list generated includes data for determining cable connections from the cable identifiers.

12. The system of claim 11, wherein each cable is provided with the same identifier at each of its terminals.

13. The system of claim 10, wherein the identifier reading device is a hand-held device.

14. The system of claim 10, further comprising a central processor connectable with the hand-held device for the download of read identifiers, a master list being stored in a machine readable memory accessible to, or within, the central processor.

15. The system of claim 14, wherein the connection of the hand-held device to the central processor is wireless.

16. The system of claim 14, wherein the central processor is operable to identify components from the cable and location identifiers, the stored list including data relating to the components and thereby of the connections between components.

17. The system of claim 14, wherein the central processor is operable to identify changes that have occurred in the recorded connections within a specified period of time.

18. The system of claim 14, wherein the central processor is operable to integrate data and voice configuration information into a structured cabling and equipment browser to provide a single view of all information related to the structured cabling channel and services provided.

19. A system for managing a structured cabling system of the type including ports and cables, comprising: machine-readable identifiers physically applied to the ports and the cables in said structured cabling system; one or more hand-held devices equipped with a machine-readable identifier reader to record moves and changes by scanning said machine-readable identifiers applied to said ports and cables; one or more computer readable memories for storing details of equipment, its location and type in a relational database on the hand-held devices; means for synchronising any moves or changes stored on the hand-held devices with a desktop system or server; and wireless local area network technology to synchronise the hand-held device with the desktop system or server.

20. A method of recording or auditing connections in a structured cabling system comprising the ordered steps of:
   first, labelling both ends of each patch cord with same identifier, the identifiers being unique for all patch cords and labelling each port in the cross connect with a unique identifier;
   then, using a hand-held scanner to record sequentially the identifiers of each port and the identifiers of the cable connected to it;
   thereafter, inferring which ports are connected together by correlating the identifiers on the cables without the need to trace the physical cables; and
   finally, utilising a one-click approach to making, breaking and auditing connections optimised for the changing of connections in patch-panels.

* * * * *